United States Patent [19]
Holt et al.

[11] Patent Number: 4,715,574
[45] Date of Patent: Dec. 29, 1987

[54] SAFETY LOCK FOR MATERIALS HANDLING SYSTEM

[75] Inventors: Alyn R. Holt; Robert E. Matthiessen, both of Cherry Hill, N.J.

[73] Assignee: inTest Corporation, Cherry Hill, N.J.

[21] Appl. No.: 796,911

[22] Filed: Nov. 12, 1985

[51] Int. Cl.⁴ .............................................. B25J 1/12
[52] U.S. Cl. ................................. 248/297.1; 187/94; 901/49
[58] Field of Search ............... 248/297.1, 123.1, 162.1, 248/320, 321, 364; 901/49; 187/94, 73, 46; 182/148

[56] References Cited

U.S. PATENT DOCUMENTS

| | | |
|---|---|---|
| 907,021 | 12/1908 | Farnsworth . |
| 1,124,609 | 1/1915 | Guffey . |
| 1,156,245 | 10/1915 | Mosby . |
| 1,235,017 | 7/1917 | Downey . |
| 1,371,011 | 3/1921 | Waite ............................... 248/297.1 |
| 1,960,869 | 5/1934 | Bartolomes . |
| 2,291,180 | 7/1942 | Wiesner . |
| 2,916,248 | 12/1959 | Ittermann ......................... 248/297.1 |
| 3,960,286 | 6/1976 | Spooner ............................. 214/674 |
| 4,359,207 | 11/1982 | Moryonovich ..................... 254/272 |
| 4,527,942 | 7/1985 | Smith ................................. 414/590 |

*Primary Examiner*—Reinaldo P. Machado
*Assistant Examiner*—Alvin Chin-Shue
*Attorney, Agent, or Firm*—Ratner & Prestia

[57] ABSTRACT

A materials handling system in which a load is maintained in a substantially weightless condition for easy and accurate positioning. A safety lock is introduced to prevent unlocking of the system if a condition of imbalance takes place while the system is locked.

16 Claims, 5 Drawing Figures

SAFETY LOCK FOR MATERIALS HANDLING SYSTEM

TECHNICAL FIELD

The present invention relates, in general, to materials handling and, in particular, to a safety lock for a materials handling system in which a unit being positioned is held in a substantially weightless condition by the application of suitable counterbalances. Although the present invention is particularly applicable to a system of the type described, illustrated and claimed in U.S. Pat. No. 4,527,942, it will be readily apparent that the present invention has broader application.

BACKGROUND ART

U.S. Pat. No. 4,527,942 is incorporated herein by reference. This patent relates to a system for manipulating and positioning electronic test head loads. Through the proper application of counterbalances, the load unit is placed in a substantially weightless condition, whereby it may be manipulated and positioned quite easily and accurately.

In ordinary operation of such systems, after the load unit has been placed in the desired position, the load unit is locked in place. With such systems, if the balanced condition is lost while the load is locked in place and this fact is unknown to an operator of the system, upon release of the locking mechanism movable parts of the system will move in a rapid and uncontrolled manner. Such an unbalanced condition can result from loss of the counterbalancing weight, removal of the load unit, or failure of one of the components in the balancing portion of the system.

DISCLOSURE OF THE INVENTION

Accordingly, it is an objective of the present invention to provide a new and improved materials handling system.

It is another objective of the present invention to provide a new and improved materials handling system in which the manipulation and positioning of a unit is controlled by counterbalancing.

It is a further objective of the present invention to provide a safety-lock system for such a materials handling system, so that if a balanced condition is lost while the system is locked, the system cannot be unlocked.

These and other objectives are achieved, according to the present invention, by a system for positioning and locking in-place a load in a substantially weightless condition which includes support means, including a vertical shaft, and a load carrying unit adapted to receive the load and movable along the shaft to position the load at a desired height. Also included are counterbalancing means coupled to the load carrying unit for placing the load carrying unit and the load in a substantially weightless condition. The present invention further includes a lock block having a bore through which the shaft extends which is movable along the shaft and locking means projecting through the wall of the bore in the lock block which engage the shaft to lock the lock block against vertical movement along the shaft. A rotatable handle coupled to the locking means controls the locking means. Rotation of the handle in one direction causes the locking means to engage the shaft and rotation of the handle in an opposite direction causes the locking means to become disengaged from the shaft. Safety locking means, movable with the load carrying unit, are provided for preventing rotation of the handle upon a preselected movement of the load carrying unit relative to the lock block caused by a loss of the balanced condition.

BEST MODES OF CARRYING OUT THE INVENTION

Figure 1:
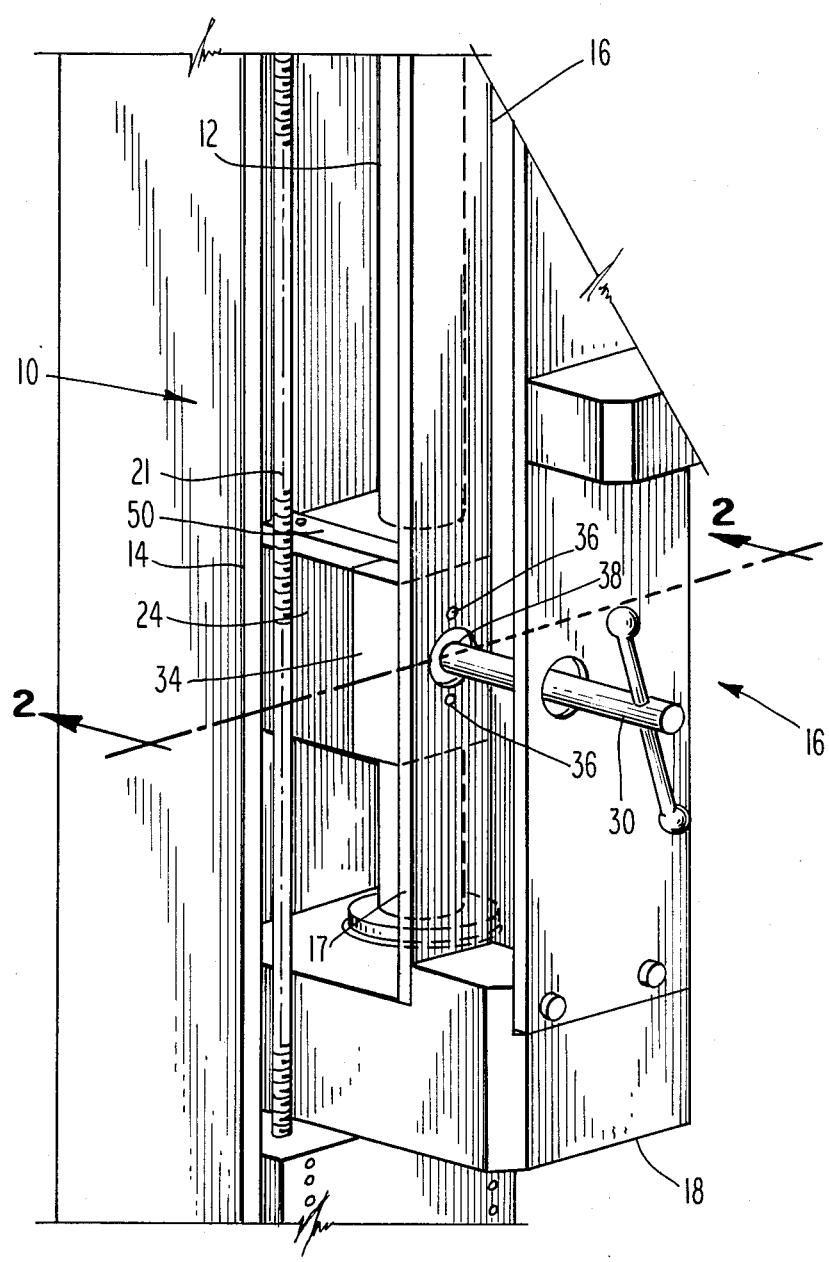
FIG. 1 is a perspective view of a first preferred embodiment of the present invention.
Figure 2:
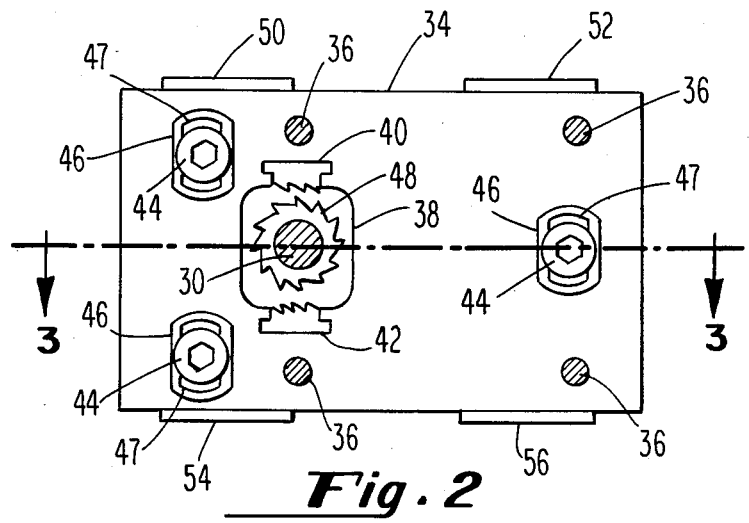
FIG. 2 is a vertical section taken along line 2—2 of FIG. 1.
Figure 3:
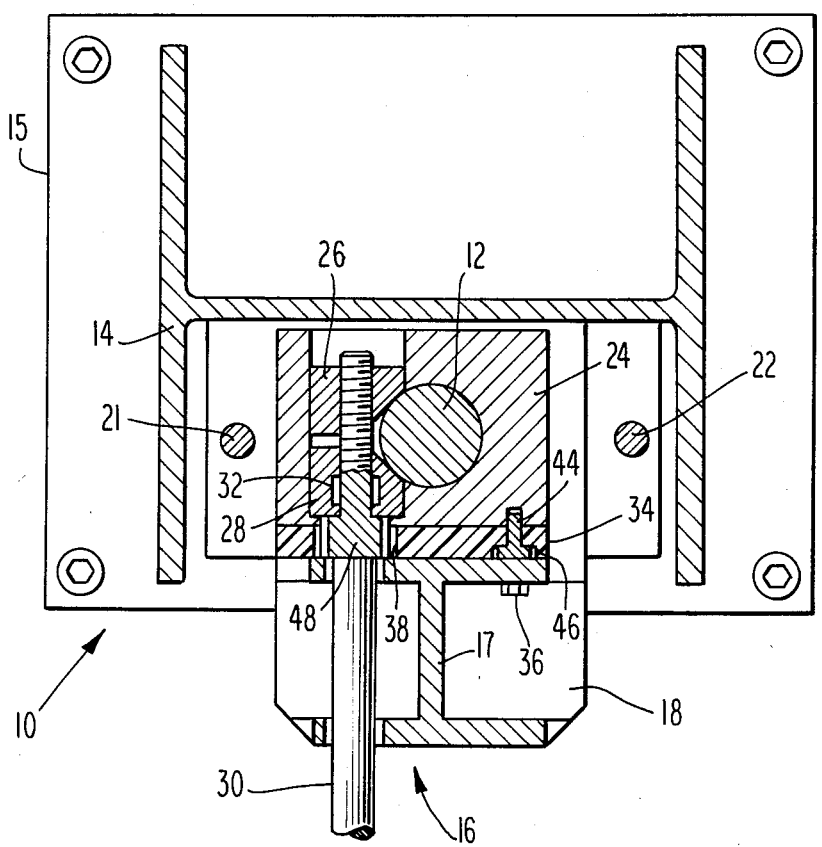
FIG. 3 is a horizontal section taken along line 3—3 of FIG. 2.

Referring to FIGS. 1, 2 and 3, a materials handling system, constructed in accordance with the present invention, includes support means, identified generally by reference numeral 10, which include a vertical shaft 12. Support means 10 also may include a column 14, in the form of H-shaped beam, which extends upward from a base plate 15. Additional details about support means 10 can be obtained by reference to U.S. Pat. No. 4,527,942.

The materials handling system of FIGS. 1, 2 and 3 further includes a load carrying unit 16 adapted to receive a load which is to be positioned at a desired height along shaft 12. Load carrying unit 16 includes an I-beam 17 which is mounted for movement along shaft 12 by means of a pair of bearing blocks. Only lower bearing block 18 is shown in the drawings. Additional details about load carrying unit 16 and the manner in which the load carrying unit receives a load for positioning along shaft 12 also can be obtained by reference to U.S. Pat. No. 4,527,942.

The materials handling systems illustrated in FIGS. 1, 2 and 3 further includes counterbalancing means coupled to load carrying unit 16 for placing the load carrying unit and the load in a substantially weightless condition. Only cables 21 and 22 of the counterbalancing means are shown in the drawings.

A lock block 24 having a bore through which shaft 12 extends is movable along the shaft. A conventional wedge lock system having two wedges 26 and 28 projecting through the wall of the bore in lock block 24 engage shaft 12 to lock the lock block against vertical movement along the shaft. This is accomplished by a rotatable handle 30 coupled to wedges 26 and 28. Specifically, a threaded end of handle 30 engages a threaded bore in wedge 26. Wedge 28 is mounted on handle 30 by means of a needle bearing 32 and rotates freely about the handle. Upon rotation of handle 30 in one direction, wedges 26 and 28 engage shaft 12 to fix the position of lock block 24 on shaft 12, while rotation of handle 30 in an opposite direction causes wedges 26 and 28 to become disengaged from shaft 12, thereby permitting lock block 24 to be moved along the shaft.

In normal operation, load carrying unit 16 and the load carried by the load carrying unit are counterbalanced to permit easy movement along shaft 12 to position the load at a desired height. Next, lock block 24 is locked in place along shaft 12 by turning handle 30 clockwise to cause wedges 26 and 28 to engage the shaft.

When load carrying unit 16 and its load are to be repositioned, handle 30 is turned counterclockwise to disengage wedges 26 and 28 from shaft 12.

If the balanced system becomes unbalanced while lock block 24 is locked to shaft 12 and this fact is unknown to the individual unlocking the lock block from the shaft, an undesirable condition exists. A loss in the counterweights causes load carrying unit 16 and its load to move downward suddenly, while removal of the load will cause unit 16 to move upward suddenly.

Accordingly, the present invention also includes safety locking means movable with load carrying unit 16 for preventing rotation of handle 30 upon a preselected movement of the load carrying unit relative to lock block 24. Such means may include a safety block, in the form of a panel 34, bearing against I-beam 17 and secured to the I-beam by suitable means, such as a plurality of screws 36. Panel block 34 has a bore 38 through which handle 30 extends.

As shown most clearly in FIG. 2, a pair of pawls 40 and 42 are positioned in the wall of bore 38. Both upper pawl 40 and lower pawl 42 are in vertical alignment with the axis of handle 30.

Panel block 34 also is attached to lock block 24 for limited vertical movement of the panel block relative to the lock block. This is accomplished by a plurality of socket head shoulder screws 44 having the undersides of their heads slip fit against the bottoms of a corresponding number of elongated counterbores 46 provided in that face of panel block 34 which bears against I-beam 17. The shoulders of screws 44 extend through bores 47 in panel block 34 into lock block 24. The opposite face of panel block 34 bears against lock block 24.

Bores 47 are elongated and sized relative to the shoulders of screws 44 to permit a preselected vertical movement of load carrying unit 16 relative to lock block 24 while the lock block is locked to shaft 12. The clearance for the shoulders of screws 44 to move vertically within bores 47 is shown in FIG. 2. With panel block 34 secured to I-beam 17 by means of screws 36, the panel block slides relative to lock block 24 for vertical movements of load carrying unit 16 while the lock block is locked to shaft 12.

Handle 30 carries a circular ratchet 48 which is in vertical alignment with upper pawl 40 and lower pawl 42. The teeth of ratchet 48 are spaced from upper and lower pawls 40 and 42 during a substantially weightless condition of load carrying unit 16. This spacing corresponds to the preselected movement of load carrying unit 16 relative to lock block 24, whereby upon this preselected movement of the panel block, as it moves with the load carrying unit, the teeth of ratchet 48 engage one of the pawls 40 or 42, depending upon the direction of movement. Upon engagement of the teeth of ratchet 48 with one of the pawls, handle 30 is locked against rotation. In this way, the system cannot be unlocked if it becomes unbalanced while it is locked in place on shaft 12.

Slight imbalances in the system, caused by other than removal of the load or loss of the counter-weights, should not be effective in preventing unlocking of lock block 24. Thus, spring biasing means are included to prevent relative movement between load carrying unit 16 and lock block 24 until a preselected imbalance from the substantially weightless condition is exceeded. For the embodiment of the invention shown in FIGS. 1, 2 and 3, the spring biasing means extend between lock block 24 and panel block 34 and include a plurality of leaf springs 50, 52, 54 and 56, all attached to the lock block. With the heights of lock block 24 and panel block 34 being substantially the same, leaf springs 50 and 52, extending from the top of the lock block, bear against the top of safety block 34 during the substantially weightless condition of load carrying unit 16, while leaf springs 54 and 56, extending from the bottom of the lock block, bear against the bottom of the panel block during the substantially weightless condition of the load carrying unit. Until the resistance of leaf springs 50 and 52 against upward movement of panel block 34 is exceeded or until the resistance of leaf springs 54 and 56 against downward movement of the panel block is exceeded, the panel block remains in place and the teeth of ratchet 48 remain disengaged from pawls 40 or 42.

Panel block 34 preferably is formed from a low friction material, for example a low friction plastic or zinc. As such, there is limited frictional resistance against panel block 34 sliding along lock block 24 when the system becomes unbalanced while the lock block is locked to shaft 12.

Figure 4:
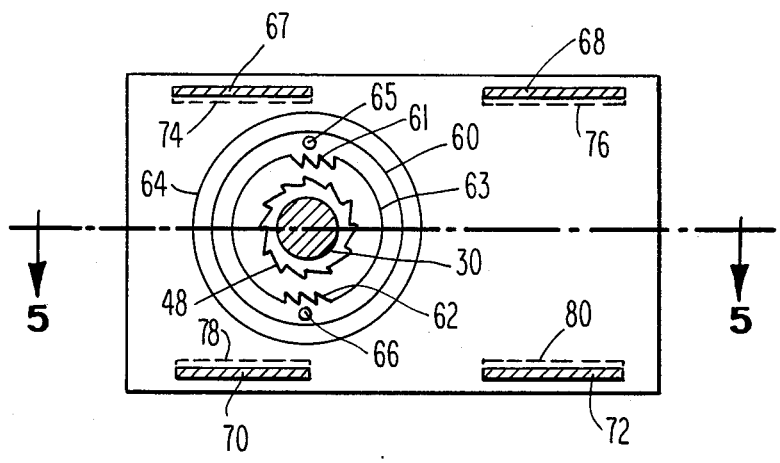
FIG. 4 is a vertical section, similar to FIG. 2, of a second preferred embodiment of the present invention.
Figure 5:
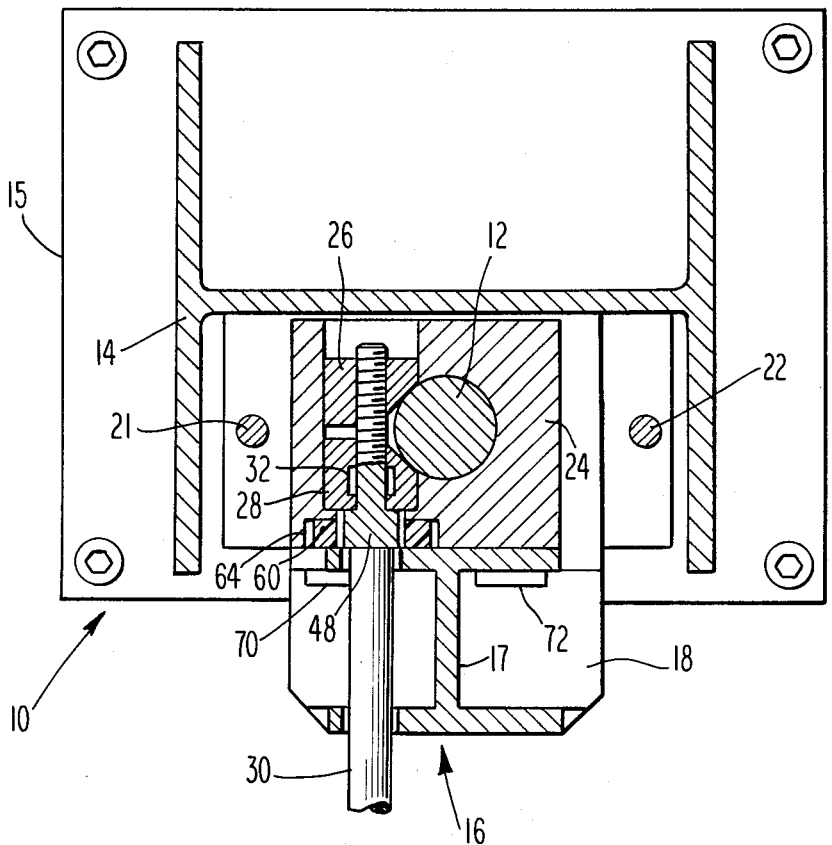
FIG. 5 is a horizontal section taken along line 5—5 of FIG. 4.

FIGS. 4 and 5 show a second preferred embodiment of the present invention. Similar reference numerals are used for components in the second embodiment corresponding to components in the first embodiment shown in FIGS. 1, 2 and 3. The main differences between the two embodiments are in the arrangement of the spring biasing means and in the form and position of the safety block.

In the embodiment of FIGS. 4 and 5, the safety block is in the form of an annular ring 60 which carries upper and lower pawls 61 and 62, respectively, on its inside surface or bore 63. Annular ring 60 is fitted within a counterbore 64 in lock block 24, so that the surface of the lock block having counterbore 64 is positioned adjacent I-beam 17. Counterbore 64 is axially aligned with handle 30.

The outside radius of annular ring 60 is smaller than the radius of counterbore 64 by an amount corresponding to the preselected movement of load carrying unit 16. In order to permit annular ring 60 to move to cause engagement of ratchet 48 with either upper pawl 61 or lower pawl 62, the top and the bottom of the annular ring are spaced from the top and the bottom, respectively, of counterbore 64, during a substantially weightless condition of load carrying unit 16, by a distance no less than the preselected movement of the load carrying unit.

Annular ring 60 is secured to I-beam 17 by means of a pair of screws 65 and 66 which are most clearly shown in FIG. 4. Upon upward or downward movement of I-beam 17, annular ring 60 moves towards or away from upper and lower pawls 61 and 62, depending upon the direction of movement of I-beam 17 and, if the effect of the spring biasing is overcome, the teeth of ratchet 48 engage one or the other of the pawls.

In the second embodiment of the invention shown in FIGS. 4 and 5, the spring biasing means again include four leaf springs 67, 68, 70 and 72 which extend through four openings 74, 76, 78 and 80 in I-beam 17, shown in phantom FIG. 4. While load carrying unit 16 is in a substantially weightless condition, leaf springs 67 and 68 bear against the tops of openings 74 and 76, while leaf springs 70 and 72 bear against the bottoms of openings 78 and 80. Until the resistance of leaf springs 67 and 68 against downward movement of load carrying unit 16 is exceeded or until the resistance of leaf springs 70 and 72 against upward movement of the load carrying unit is exceeded, annular ring 60, attached to the load carrying unit, remains in place and the teeth of ratchet 48 remain disengaged from pawls 61 and 62. When the resistance of the spring biasing means is overcome, annular ring 60 moves upward or downward, depending upon the direction of imbalance, and ratchet 48 engages one of the pawls 61 or 62 to prevent rotation of handle 30 to unlock the system.

While in the foregoing there have been described preferred embodiments of the present invention, it should be understood to those skilled in the art that various modifications and changes can be made without departing from the true spirit and scope of the invention as recited in the claims.

What is claimed:

1. A system for positioning and locking in-place a load in a substantially weightless condition, said system comprising:
   support means including a vertical shaft;
   a load carrying unit adapted to receive said load and movable along said shaft to position said load at a desired height;
   counterbalancing means coupled to said load carrying unit for placing said load carrying unit and said load in a substantially weightless condition;
   a lock block having a bore through which said shaft extends and movable along said shaft;
   locking means projecting through the wall of said bore for engaging said shaft to lock said lock block against vertical movement along said shaft;
   rotatable means coupled to said locking means for engaging said shaft with said locking means upon rotation in one direction and for disengaging said locking means from said shaft upon rotation in an opposite direction;
   and safety locking means movable with said load carrying unit for preventing rotation of said rotatable means upon a preselected movement of said load carrying unit relative to said lock block.

2. A system according to claim 1 further including spring biasing means for preventing relative movement between said load carrying unit and said lock block until a preselected imbalance from said substantially weightless condition is exceeded.

3. A system according to claim 2 wherein said spring biasing means extend between said lock block and said safety locking means.

4. A system according to claim 2 wherein said spring biasing means extend between lock block and said load carrying unit.

5. A system according to claim 2 wherein said safety locking means include:
   a safety block secured to said load carrying unit and movable with said load carrying unit, said safety block having a bore through which said rotatable means extends;
   upper and lower pawls positioned in the wall of said bore in said safety block in vertical alignment with the axis of said handle;
   and a circular ratchet carried on said rotatable means in vertical alignment with said upper and lower pawls, the teeth of said ratchet spaced from said upper and lower pawls during a substantially weightless condition of said load carrying unit and said load by a distance corresponding to said preselected movement of said load carrying unit relative to said lock block, whereby upon said preselected movement of said safety block the teeth of said circular ratchet engage one of said pawls and prevent rotation of said rotatable means.

6. A system according to claim 5 wherein said safety block is attached to said lock block for limited vertical movement of said safety block relative to said lock block.

7. A system according to claim 6 wherein said spring biasing means extend between said lock block and said safety block.

8. A system according to claim 7 wherein a first vertical face of said safety block bears against said load carrying unit and the opposite vertical face of said safety block slidingly bears against said lock block.

9. A system according to claim 5 wherein:
   said lock block is adjacent to said load carrying unit and has a counterbore in the surface adjacent said load carrying unit axially aligned with said rotatable means.
   and said safety block is fitted within said counterbore to slidingly bear against the base of said counterbore, the top and the bottom of said safety block being spaced from the top and the bottom, respectively, of said counterbore during said substantially weightless condition of said load carrying unit by a distance no less than said preselected movement of said load carrying unit.

10. A safety lock system for preventing unlocking of a balanced loaded unit mounted on and locked to a vertical shaft when said loaded unit becomes unbalanced, said safety lock system comprising:
    a lock block having a bore adapted for mounting said lock block on said shaft for movement of said lock block along said shaft;
    locking means projecting through the wall of said bore for engaging said shaft to lock said lock block against vertical movement along said shaft;
    a rotatable handle coupled to said locking means for engaging said shaft with said locking means upon rotation of said handle in one direction and for disengaging said locking means from said shaft upon rotation of said handle in an opposite direction;
    and safety locking means adapted to be secured to said loaded unit and movable with said loaded unit for preventing rotation of said handle upon a preselected movement of said loaded unit relative to said lock block.

11. A system according to claim 10 further including spring biasing means for preventing relative movement between said loaded unit and said lock block until a preselected imbalance is exceeded.

12. A system according to claim 11 wherein said spring biasing means extend between said lock block and said safety locking means.

13. A system according to claim 11 wherein said spring biasing means are attached to said lock block and are adapted to engage said loaded unit.

14. A system according to claim 11 wherein said safety locking means include:
    a safety block adapted to be secured to said loaded unit and movable with said loaded unit, said safety block having a bore through which said handle extends;
    upper and lower pawls positioned in the wall of said bore in said safety block in vertical alignment with the axis of said handle;

and a circular ratchet carried on said handle in vertical alignment with said upper and lower pawls, the teeth of said ratchet spaced from said upper and lower pawls while said loaded unit is in a balanced condition by a distance corresponding to a preselected movement of said safety block relative to said lock block, whereby upon said preselected movement of said safety block the teeth of said circular ratchet engage one of said pawls and prevent rotation of said handle.

15. A system according to claim 14 wherein said safety block is attached to said lock block for limited vertical movement of said safety block relative to said lock block.

16. A system according to claim 14 wherein:
said lock block is adapted to be positioned adjacent to said loaded unit and has a counterbore in the surface adapted to be positioned adjacent said loaded unit axially aligned with said handle;
and said safety block is fitted within said counterbore to slidingly bear against the base of said counterbore, the top and the bottom of said safety block being spaced from the top and the bottom, respectively, of said counterbore during said balanced condition of said loaded unit by a distance no less than said preselected movement of said loaded unit.

* * * * *